United States Patent Office 3,367,952
Patented Feb. 6, 1968

3,367,952
POLYMERIZATION OF UNSATURATED
FATTY ACIDS
Herbert George Arlt, Jr., Ridgefield, Conn., assignor to Arizona Chemical Company, New York, N.Y., a corporation of Delaware
No Drawing. Filed Oct. 22, 1964, Ser. No. 405,847
5 Claims. (Cl. 260—407)

ABSTRACT OF THE DISCLOSURE

There is provided a process for polymerizing unsaturated higher fatty acids in the presence of small quantities of water by (a) subjecting an unsaturated higher fatty acid under autogenous presure for from 1 to 6 hours to the action of a sulfonic acid, styrene-divinyl-benzene copolymer in particulate form of from about 20 to not smaller than about 200 mesh size and present in amounts ranging from 1% to 15% in an aqueous menstruum and at a temperature ranging from between about 180° C. and 300° C., (b) cooling the resultant reaction mixture, (c) rapidly separating within about one hour the sulfonated resin catalyst therefrom, (d) recovering a mixture comprising monomeric and polymeric higher fatty acids, and (e) separating the polymeric higher fatty acids from said mixture.

---

This invention relates to a novel method for polymerizing unsaturated fatty acids found in various oils, such as vegetable oils, tall oil and animal fats by utilizing a novel class of organic catalysts in the form of distinct particles. More particularly, the invention is concerned with a method for polymerizing unsaturated fatty acids in the presence of ion-exchange resin beads of particle size ranging from about 20 mesh to not more than 200 mesh.

As is known, unsaturated fatty acids can be polymerized by utilizing inorganic catalysts and particularly mineral clays either as such or in its acidified form. In U.S. Patent Nos. 2,793,219 and 2,793,220, there is disclosed a process for subjecting unsaturated fatty acids to the action of a crystalline mineral clay at temperatures in excess of 180° C. in the presence of small quantities of water and under autogenous pressure. It is also known that the clay catalyst employed must be extremely finely divided in a form permitting passage through at least a 200 mesh screen. This is done so as to provide an adequate catalytic surface for effecting the contemplated polymerization of unsaturated fatty acids. Unfortunately, the use of finely divided or powdery clay is not wholly satisfactory. In practice, it is extremely difficult to separate such finely divided clay from the reaction mixture with resultant loss of yield of desired product. Moreover, such clays cannot be revivified and reused. Consequently, the polymerization process suffers serious drawbacks. If a catalyst which permits ready separation from the reaction medium and its reuse could be provided, such use would enhance polymerizations of unsaturated fatty acids to an extent hitherto unattained.

It has been unexpectedly found that unsaturated fatty acids can be readily polymerized by utilizing a sulfonic acid ion-exchange resin comprising a copolymer of styrene and divinylbenzene in particulate or bead form having an average diameter sufficiently large to pass through a 20 mesh but not smaller than will pass through a 200+ mesh screen. Such ion exchange resins cause the unsaturated acids to polymerize to the extent that inorganic catalysts polymerize such acids without suffering any of the disadvantages processwise with respect to the removal and recovery of such catalysts.

According to the process of the invention, recovery of polymeric fatty acids is readily attained by utilizing sulfonic acid ion-exchange resin bead in particulate form passing through a 20 to 200 mesh screen by incorporating from 1% to 15% of the resin in an unsaturated fatty acids feed stock and adding thereto from 1 to 5% of water based on the weight of the feed stock. Reaction is carried out in an autoclave sufficient to maintain an aqueous environment during reaction whereby autogenous pressures are attained. Reaction is carried out for from 1 to 6 hours and upon termination, the contents in the reaction vessel are cooled to below about 150° C. Surprisingly, the organic catalyst is readily separated from the reaction mixture by filtration. If desired, the catalyst can be reused in a subsequent polymerization operation. Proceeding in the manner previously indicated, a minimal yield of 60% polymerized fatty acids is obtained as determined by gas chromatography. Thereafter, the mixture is readily separated by vacuum distillation into its component parts.

Gas chromatography technique as herein contemplated determines the relative amounts of the several components present in the resultant mixture obtained subsequent to polymerization. An esterification method employed in the present specification is based on one described in Analytical Chemistry, vol. 33 at page 363. In this method, the polymerization mixture is converted to the corresponding methyl esters employing boron trifluoride and methyl alcohol reagents. A standard, such as di(2-ethylhexyl)sebacate, is added and the mixture is chromatographed by programming from 200° C. to 325° C. through a 12" column which contains 5% silicone grease on a 60/80 mesh chromasorb ω. The inlet temperature of the gas chromatography apparatus is maintained at 330° C. and the detector temperature is set at 300° C. Di(2-ethylhexyl)sebacate and the polymerization mixture are fed into and passed through the aforementioned column. Monomeric fatty acids and dimeric fatty acids are calculated from the standard sebacate ester. Trimeric and other polymeric fatty acids are calculated by difference.

The acids contemplated in the present invention to be polymerized are those which are naturally occurring mixtures of monounsaturated and polyunsaturated fatty acids. As exemplary of monounsaturated acids, oleic, elaidic and erucic are mentioned. Exemplary of polyunsaturated acids are linoleic and linolenic acids. Typical mixtures containing both monounsaturated and polyunsaturated acids are found in soya-bean and tall oil fatty acids. Such acids usually contain very small amounts of $C_6$–$C_{14}$ fatty acids. The predominant acids are even numbered, normal chain fatty acids containing 16 to 22 carbon atoms. They are readily affected by sulfonic acid ion-exchange resin polymerization techniques.

Sulfonic acid ion-exchange resins herein contemplated are prepared by copolymerizing styrene and divinylbenzene and thereafter sulfonating the latter. These are commercially available under the Dowex trademark. An illustrative resin is "Dowex 50W–X4" which is a copolymer of styrene and divinylbenzene in a ratio of 96 to 4, respectively, and sulfonated to the extent of providing 5 milliequivalents per gram. Such resins are obtained in discrete, bead form. For optimum operation, the ion-exchange resin polymerization catalysts are sufficiently large to pass through a 20 mesh screen but not a 200 mesh screen. The bead or particulate form of the catalyst is of critical import in the instant polymerization procedure. Separation of reaction product rapidly occurs as contrasted with prior art use of inorganic crystalline clay catalysts of very finely divided or powdery structure. Caking of the latter catalysts occurs during filtration with attendant loss of desired polymeric and monomeric fatty acid products. Further, the resin catalysts of the present invention can be recycled after polymerization occurs and reused effectively in subsequent polymerization. Substantial reductions in cost are realized for effecting the overall fatty acid polymerization.

In general, the resin catalyst is present in an amount ranging from about 1% to 15%, and preferably between 3% and 9%, by weight based on the feed stock treated. Further, from 0.5% to 5% water is added to the feed stock prior to polymerization. Temperatures between 180° C. and 300° C. under autogenous pressure are employed during polymerization for periods ranging from 1 to 6 hours. The liquid reaction mixture is separated from the entire reaction mass by direct filtration within not more than one hour, and usually between about fifteen minutes and about forty-five minutes. It is believed that the presence of interstices attributable to the particulate form of the catalyst allows for an unobstructed and rapid passage of the reaction mixture through the catalyst on filtration. It is further noted that there is little or no adhesion of the reaction mixture to the resin catalyst whereby increased overall yields of desired polymeric fatty acid fractions are obtained.

The following examples will illustrate the procedure of the invention in greater detail. It is to be understood that these examples are merely illustrative and are not deemed to be limitative. All parts given are by weight unless otherwise specified.

EXAMPLE 1

To a rocking type autoclave containing 100 parts of tall oil fatty acids having an iodine value of 126 and an acid number of 196 are added 2 parts of water and 15 parts of Dowex 50W–4X (Ionic form H$^+$) as particulate beads passing through a 30 mesh screen but held on a 50 mesh screen. The mixture is mildly agitated and heated for four hours at 240° C. under autogenous pressure. Thereafter, the temperature is reduced to 120° C. and the water therein is flashed off at 110° C. to 118° C. Reaction mixture is filtered within forty-five minutes. Analyzing the catalyst free reaction mixture for the monomeric and polymeric fatty acids content by gas chromatography techniques after separation from catalyst by filtration, the products so analyzed 31.8% monomeric fatty acids and 68.2% polymeric fatty acids. The acids further analyzed as having an acid number of 150 and a saponification number of 175. These determinations were made utilizing techniques described in Analytical Chemistry, vol. 33, page 363.

Upon separation of the monomeric fatty acid components from the polymeric fatty acids in the reaction mixture by vacuum distillation, the monomeric fatty acid fraction contains an appreciable amount of oleic and elaidic acid as determined by gas chromatography which, if desired, can be redimerized to prepare an additional yield of polymeric fatty acids. Adopting the procedure disclosed in United States Letters Patent No. 2,793,220 in which more than one hour is required to filter the reaction mixture from the inorganic crystalline clay catalyst, a good yield of additional polymeric fatty acid mixture is obtained.

EXAMPLE 2

Repeating the procedure of Example 1 in every detail except that 5 parts of the resin catalyst in lieu of 15 parts of the same are employed. Substantially the same yields of monomeric acids and polymeric acids are obtained with equal ease of resin separation and recovery.

EXAMPLE 3

To a rocking type autoclave are added 100 parts of tall oil fatty acids having an iodine value equal to 126 and an acid number equal to 196. A mixture of 4 parts of Dowex 50W–X8 (sulfonic acid) ion exchange resin and 2 parts of water is added to the feed stock. The latter is agitated in the autoclave at 240° C. for 4 hours, whereby a pressure of between 135 and 185 lbs. per square inch gauge is developed during the heating. Cooling the mixture to from 110° C. to 120° C., any water present in the autoclave is flashed off. Resin catalyst is thereafter recovered rapidly within fifteen minutes by directly filtering the reaction mass by filtration. Liquid filtrate is next analyzed by gas chromatography. On analysis, 44% of monomeric fatty acids and 56% of polymeric fatty acids are obtained.

Recovered catalyst is then recycled to a fresh feed stock and the procedure of this example is repeated in every detail utilizing the recycled sulfonic acid ion-exchange resin. Substantially the same results are obtained both with respect to the formation of monomeric and polymeric acids and with respect to the ease of resin separation from the reaction mass.

EXAMPLE 4

The method of Example 3 is repeated in every detail except soya-bean fatty acids are treated in lieu of tall oil fatty acids and 5 parts by weight of the sulfonic acid ion exchange resin is employed in lieu of 4 parts of the same resin catalyst. A good yield of polymeric fatty acids is obtained subsequent to the rapid filtration of catalyst from the reaction mass.

EXAMPLE 5

Repeating the procedure of Example 4 in every detail except that 99% linoleic acid is employed in lieu of the soya-bean fatty acids. Rapid removal of catalyst from the reaction mass with an attendant yield of 66% polymeric acids are realized.

EXAMPLE 6

To a feed stock of 100 parts of tall oil fatty acids having an iodine value of 129 and an acid number of 196 are added 2 parts of water and 4 parts of Super Filtrol mineral clay catalyst. The mixture is then fed to an autoclave and heated to 240° C. under a pressure of about 175 lbs. per square inch gauge for 4 hours. The autoclave contents therein are cooled and filtered for more than three hours to separate filtrate from the mineral clay.

I claim:

1. A process for polymerizing unsaturated higher fatty acids in the presence of small quantities of water which comprises the steps of: subjecting an unsaturated higher fatty acid under autogenous pressure for from 1 to 6 hours to the action of a sulfonic acid, styrene-divinylbenzene copolymer in particulate form of from about 20 to not smaller than about 200 mesh size and present in amounts ranging from 1% to 15% in an aqueous menstruum and at a temperature ranging from between about 180° C. and 300° C.; cooling the resultant reaction mixture; rapidly separating within about one hour the sulfonated resin catalyst therefrom; recovering a mixture comprising monomeric and polymeric higher fatty acids; and separating the polymeric higher fatty acids from said mixture in good yield.

2. A process according to claim 1 in which the fatty acid comprises tall oil fatty acids.

3. A process according to claim 1 in which the fatty acid comprises soya-bean fatty acids.

4. A process according to claim 1 in which the fatty acid comprises linolenic acid.

5. A process according to claim 1 in which the resin catalyst is in particulate form of 30 to 50 mesh size.

References Cited

UNITED STATES PATENTS 2,048,137  6/1937  Geiger et al. -------- 260—407

FOREIGN PATENTS 10,348  8/1955  Germany.

OTHER REFERENCES

Kunin, Ion Exchange Resins, 1958, p. 257.

Polyanskii et al., Kinetics and Catalysis, vol. 3, 1962, p. 136.

ALEX MAZEL, *Primary Examiner.*

R. GALLAGHER, *Assistant Examiner.*